United States Patent [19]

Suginoya et al.

[11] Patent Number: 5,770,349
[45] Date of Patent: Jun. 23, 1998

[54] MANUFACTURING METHOD OF MULTICOLOR LIQUID CRYSTAL DISPLAY

[75] Inventors: Mitsuru Suginoya; Shunichi Motte; Takakazu Fukuchi; Hitoshi Kamamori, all of Chiba; Yoshikatsu Okada; Akiko Sakurai, both of Hyogo, all of Japan

[73] Assignees: Seiko Instruments Inc., Chiba; Sumitomo Chemical Co., Ltd., Osaka, both of Japan

[21] Appl. No.: 821,028

[22] Filed: Mar. 20, 1997

Related U.S. Application Data

[63] Continuation of Ser. No. 580,019, Dec. 20, 1995, abandoned.

[30] Foreign Application Priority Data

Dec. 22, 1994 [JP] Japan .................................. 6-320989

[51] Int. Cl.$^6$ ............................ G02B 5/20; G02F 1/1335
[52] U.S. Cl. .............................. 430/321; 430/7; 349/106
[58] Field of Search ................... 430/7, 321, 20; 349/106

[56] References Cited

U.S. PATENT DOCUMENTS

| | | | |
|---|---|---|---|
| 4,812,387 | 3/1989 | Suzuki et al. | 430/311 |
| 5,227,044 | 7/1993 | Matsumura et al. | 205/118 |
| 5,314,771 | 5/1994 | Yamauchi et al. | 430/7 |
| 5,439,582 | 8/1995 | Oka et al. | 205/135 |
| 5,503,952 | 4/1996 | Suzuki et al. | 430/7 |
| 5,578,403 | 11/1996 | Watanabe et al. | 430/7 |

FOREIGN PATENT DOCUMENTS

| | | |
|---|---|---|
| 0 572 672 A | 12/1993 | European Pat. Off. . |
| 0 674 208 A | 9/1995 | European Pat. Off. . |
| 61-011703 | 1/1986 | Japan . |
| 1-158401 | 6/1989 | Japan . |
| 6-273618 | 9/1994 | Japan . |

OTHER PUBLICATIONS

Patent Abstracts of Japan, vol. 11, No. 129, (JP 61 272720A, Dec. 1986).
Patent Abstracts of Japan, vol. 14, No. 265, (JP 02 073305A, Mar. 1990).
Patent Abstracts of Japan, vol. 17, No. 626 (JP 05 203807A, Aug. 1993).
Patent Abstracts of Japan, vol. 16, No. 197 (JP 04 030118A, Feb. 1992).

*Primary Examiner*—John A. McPherson
*Attorney, Agent, or Firm*—Loeb & Loeb LLP

[57] ABSTRACT

This invention allows the high image quality multicolor liquid crystal display to be manufactured by a simple method in which color filters are applied by patterning an insulating resist on a plurality of electrodes formed on a substrate, by forming color filters one after another by way of electro-deposition and by patterning a light shielding substance at gaps of the color filters by utilizing the color filter as masks.

1 Claim, 4 Drawing Sheets

MANUFACTURING METHOD OF MULTICOLOR LIQUID CRYSTAL DISPLAY

This is a continuation of application Ser. No. 08/580,019 filed on Dec. 20, 1995, now abandoned.

BACKGROUND OF THE INVENTION

The present invention relates to a method for manufacturing a multicolor liquid crystal display in which color filters are applied and more particularly to a simple method for manufacturing an active matrix multicolor liquid crystal display presenting a high image quality.

PRIOR ART

FIGS. 2a and 2b are section and frontal views of a prior art multicolor liquid crystal display. In the figures, the reference numerals denotes a glass substrate 11, transparent electrodes 12 composed of ITO or the like and patterned into stripes, color filters 13 created on the transparent electrodes 12 by way of electro-deposition, light shielding layers 14 formed only in gaps between color filters by applying a photosensitive substance containing a light shielding substance such as carbon on the color filters 13 and by exposing and developing it from the opposite side of the face where the color filters are formed by utilizing the color filters as masks, and a second glass substrate 15 on which transparent electrodes 16 and thin film transistors 17 are formed. The multicolor liquid crystal display is formed by pasting the color filter substrate 11 and the thin film transistor substrate 15 thus formed together by a sealing compound 18 so as to keep a predetermined gap therebetween and filling liquid crystal 19 in the gap.

The multicolor liquid crystal display thus formed has a good contrast owing to the switching characteristics of the thin film transistors and the color filters are formed simply by electro-deposition, so that a high quality and low cost multicolor display may be obtained.

Problems to be Solved by the Invention:

However, although the multicolor liquid crystal display like the prior art is simple to make because the light shielding layer is formed in self-alignment utilizing the color filters as the masks, no light shielding layer is formed inevitably where there is the color filter. Further, although the color filter is simple to make because it is formed by way of electro-deposition, it requires a wiring for feeding electricity and the color filter is inevitably formed at part where there is no pixel.

Due to that, the whole periphery of the pixel could not be surrounded by the light shielding layer in the prior art method for manufacturing the multicolor liquid crystal display. Meanwhile, although the display using thin film transistors allowed a high contrast, its characteristic is apt to be changed by light and it has been necessary to shield outside light to stabilize its operation.

Accordingly, it is necessary to eliminate the leakage of light from the periphery of the pixel, which had been unavoidable in the prior art method, to completely shield the periphery of the pixel. Thereby, the operation of the thin film transistors may be stabilized and the contrast will be improved further as stray light is eliminated.

SUMMARY OF THE INVENTION

In order to solve the aforementioned problems, according to the present invention, the periphery of the pixel of the multicolor display combined with the thin film transistor is completely shielded and the leakage of light from the periphery of the pixel is eliminated by fabricating a color filter substrate by the steps of:

1) patterning an insulating resist on a plurality of electrodes formed on a substrate;

2) selectively energizing the plurality of electrodes to form color filters by way of electro-deposition on the electrodes;

3) forming a light shielding substance on the color filters; and 4) exposing the light shielding substance from the opposite side from the substrate face where the color filters have been formed by utilizing the color filters as a mask to pattern the light shielding substance so as to leave it only at the gap between the color filters. Thereby, a multicolor liquid crystal display in which the operation of the thin film transistor is stabilized, stray light is eliminated and the display quality and the contrast are improved is provided.

The point of the present invention lies in the manner in which the dot-shaped color filters separated from each other in an isolated manner can be formed by way of electro-deposition. It is necessary to coat insulative resist on a part of a pixel electrode so as not to cause electrodeposition on that part. A problem of this method is how to handle the insulating resist, which is a useless layer when forming a light shielding layer later, so that it will not hamper the formation of the light shielding layer. Further, the point is how the insulating resist can be removed without damaging the color filters. Because both the color filter and the insulating resist are resin, it is difficult to selectively remove only one of them. According to the present invention, solutions for solving each problem have been found.

For the first problem, a method of forming the insulating resist to be relatively thinner than the color filter and of forming the light shielding layer thereon without peeling off the insulating resin was found. According to this method, although the light shielding layer on the electrode becomes thicker than the light shielding layer at the gap between the color filters by the insulating resin, there exists less difference in level, thus causing no disturbance of orientation of the liquid crystal display, because the thickness of the resist is thinned to the minimum requirement which causes no electro-deposition. That is, it is a simple method requiring no process for peeling the insulating resin.

For the other problem, a method of selecting an alkali as a peeling agent in peeling the insulating resin and of selecting a cationic resin as a resin to be electro-deposited was found. As a photoresist, generally there are solvent peeling type, alkali peeling type, nitric acid peeling type photoresists. In the solvent peeling, the color filter resin is apt to cause a swelling and to be dissolved because a strong organic solvent is used. In the nitric acid peeling, because the resin is oxidized and decomposed, the color filter resin is also oxidized and decomposed in the same manner. In the alkali peeling, the color filter is not eroded in peeling the insulating resin as long as a type of resin which is not neutralized and dissolved by alkali is selected as the color filter resin because the peeling is carried out by neutral dissolution of a functional group of the resin.

As a typical photoresist, a phenolic novolak resin or the like is used as a positive resin and a substrate resin such as a synthetic rubber is used as a negative resin. While there are various types of peeling agents such as the alkali, nitric acid and solvent type peeling agents, the alkali dissolution type agent is commercially available.

As the electro-deposition resin, there are two types of resins, an anion type in which poly-carboxylic acid is neutralized by alkali such as amine and a cation type in which poly-amine is neutralized by acid. While the anion type is electro-deposited at the anode, the deposited film is essentially an alkali-soluble type film and the color filters are eroded by the alkali when the insulating resin is peeled by the alkali after forming the color filters by way of electro-deposition as in the present invention.

In contrast, in the cation type, because the color filter is deposited at the cathode and the deposited film is essentially oxide-soluble and alkali-insoluble, the color filters are not eroded when the insulating resin is peeled off by the alkali and the insulating resin can be peeled off readily. As cation type electro-deposition resins, there are acrylic resin, epoxy resin, urethane resin, polybutadiene resin, polyamide resin and the like, and they are used singularly, in a mixed form or in combination with a bridging resin such as urethane resin and polyesther resin. All of the resins have a basic functional group such as an amino group and an onium group such as ammonium, sulfonium, or phosfonium within the molecules and are used in a form which is solubilized in water by acid or acid substance such as acetic acid, formic acid, propionic acid and lactic acid.

When the light shielding film is formed in self-alignment by utilizing the color filters as masks in the same manner with the prior art technology after forming the color filters in accordance with a desired pixel shape, not in stripes, the light shielding film covers the whole periphery of the pixels, thus enhancing the light shielding performance and providing an excellent display quality.

DETAILED DESCRIPTION OF THE PREFERRED EMBODIMENTS

The effects of the present invention will be explained concretely below based on preferred embodiments.

Figure 1:
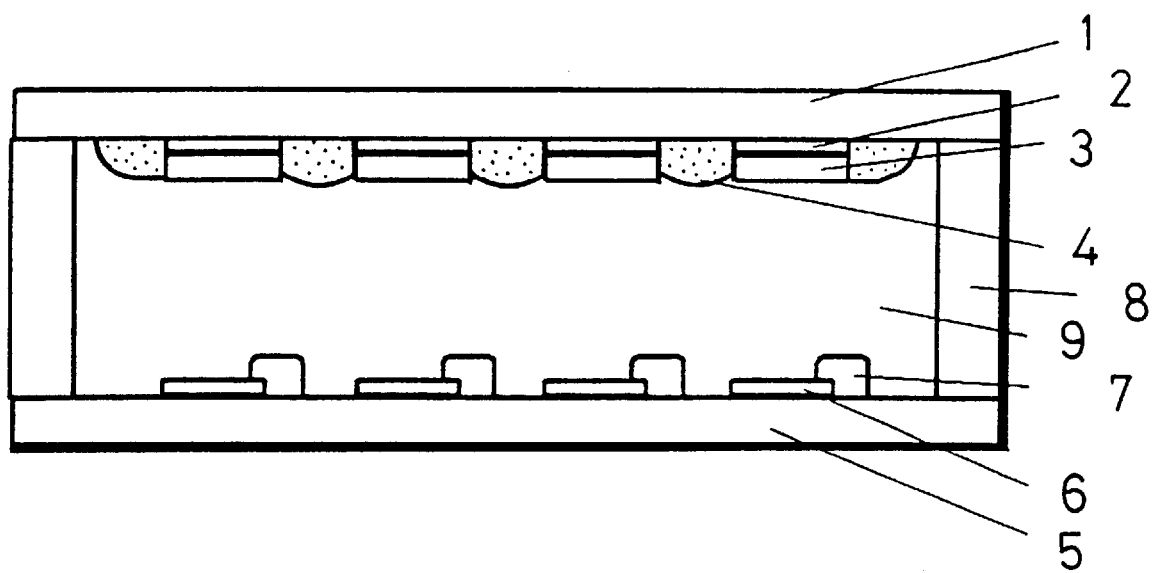
FIG. 1 is a section view of a multicolor liquid crystal display according to the present invention.
Figure 2A:
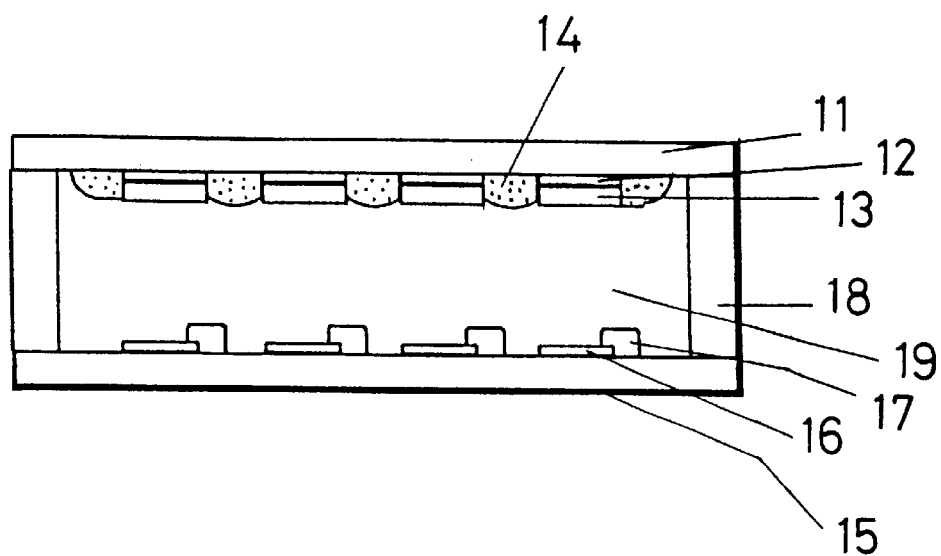
FIGS. 2a and 2b are section and frontal views of a prior art multicolor liquid crystal display.
Figure 2B:
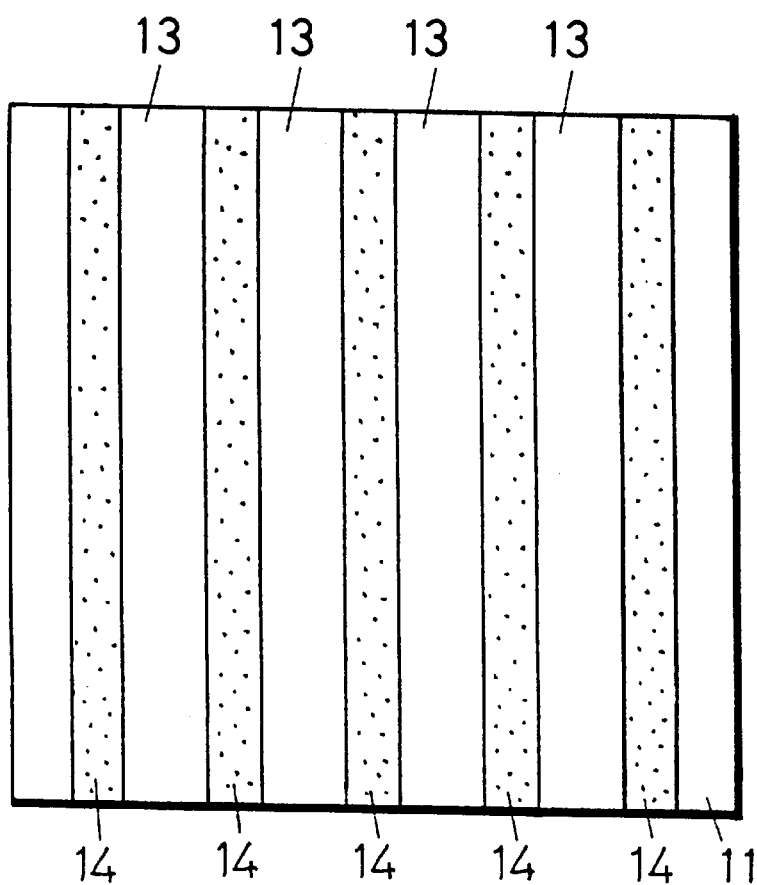

FIG. 1 shows a section view of a multicolor liquid crystal display of the present invention. In the figure, the reference numerals denote a glass substrate 1, transparent electrodes 2 composed of ITO or the like and patterned into stripes, color filters 3 created on the transparent electrodes 2 by way of electro-deposition so that their shape coincides with a pixel, and light shielding layers 4 formed by applying a photosensitive substance containing a light shielding substance such as carbon on the color filters 3 and by exposing and developing it from the opposite side of the face where the color filters are formed by utilizing the color filters as masks so that they cover the periphery of the color filters.

FIGS. 3A through 3D' show the method for creating the above-mentioned color filter substrate by section views and frontal views thereof.

Figure 3A:
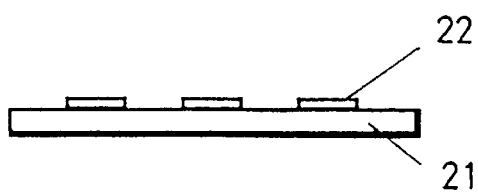
FIGS. 3A through 3D' are views showing a manufacturing process of a color filter substrate according to the present invention.
Figure 3A:
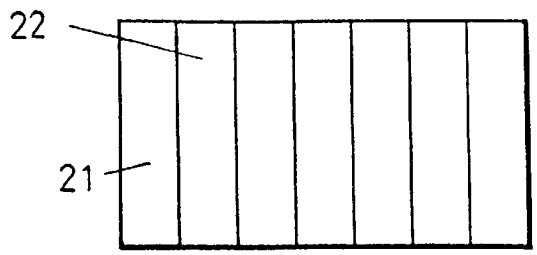

In FIGS. 3A and 3A', the reference numerals denote a glass substrate 21 and transparent electrodes 22 formed in stripes by forming ITO and then patterning it.

Figure 3B:
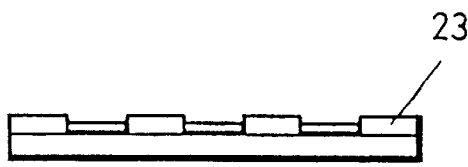
Figure 3B:
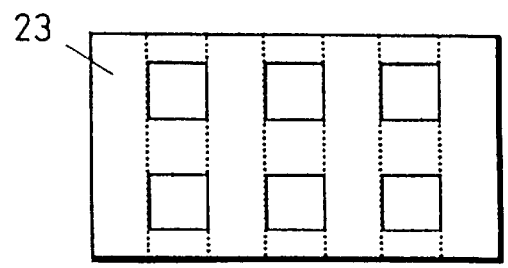

In FIGS. 3B and 3B', 0.1 $\mu$m of negative resist (V-259-PA, produced by Nippon Steel Chemical Co., Ltd.) was applied on the transparent electrodes 22. After that, it was exposed into a shape of desirable pixel and then developed by sodium carbonate solution to form insulating resist pattern 23.

Figure 3C:
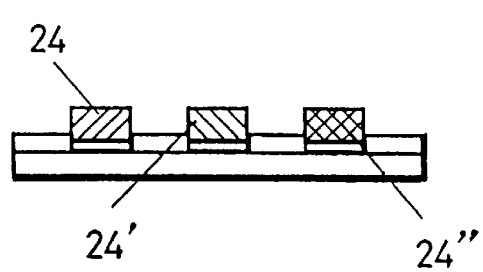
Figure 3C:
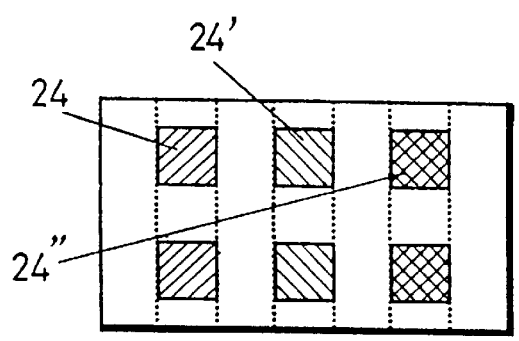

In FIGS. 3C and 3C', a group of pixels to be colored red was selected among the transparent electrodes 22, the transparent electrodes 22 were anodized by an anionic polyester electro-deposition resin and dispersed solution of red pigment, and red color filters 24 were formed by electro-deposition. Suceedingly, the same operation was repeated for green and blue to create color filters 24, 24' and 24" with 1.5 $\mu$m of thickness.

Figure 3D:
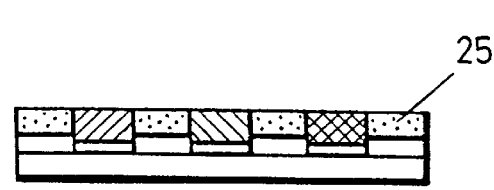
Figure 3D:
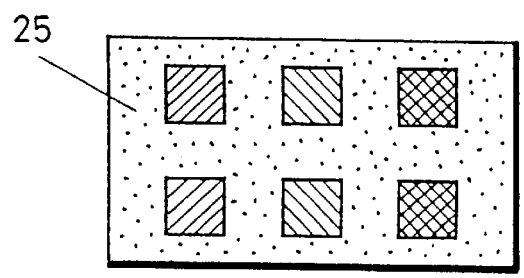

In FIGS. 3D and 3D', a black resist in which carbon was mixed into negative resist (V-259-PA, produced by Nippon Steel Chemical Co., Ltd.) was applied on the color filters, was exposed from the back side utilizing the color filters as masks and was developed to form a light shielding film 25. Note that because alkali used in the development was much weaker than one used in peeling, the color filter was not eroded as long as it had been hardened.

Returning to FIG. 1, the multicolor liquid crystal display is formed by pasting the color filter substrate 1 thus formed in the manner completely shielding the periphery of the color filter pixels and a second glass substrate 5 on which pixel transparent electrodes 6 and thin film transistors 7 are formed together by a sealing compound 8 so as to keep a predetermined gap therebetween and by filling liquid crystal 9 in the gap.

Even though the multicolor liquid crystal display is fabricated thus by the simple method, the periphery of the pixels is completely shielded and there is no degradation of the characteristic of the thin film transistor, thus showing a high display quality. Further, because the light shielding film has a difference in level of only 0.1 $\mu$m of the insulating resist, it allows a homogeneous orientation to be maintained, causing no orientation disorder.

The color filter substrate the according to second embodiment was fabricated by a method shown in section views and frontal views in FIGS. 4A through 4E'.

Figure 4A:
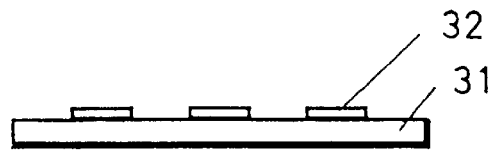
FIGS. 4A through 4E' are views showing another manufacturing process of a color filter substrate according to the present invention.
Figure 4A:
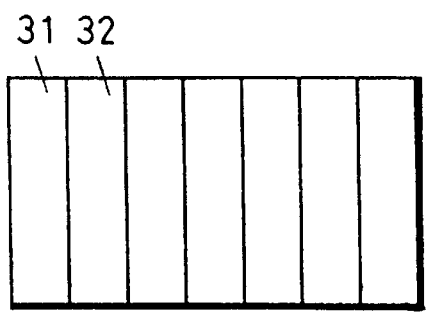

In FIGS. 4A and 4a', the reference numeral 31 denotes a glass substrate, and transparent electrodes 32 are formed in stripes by forming ITO and then patterning it.

Figure 4B:
Figure 4B:
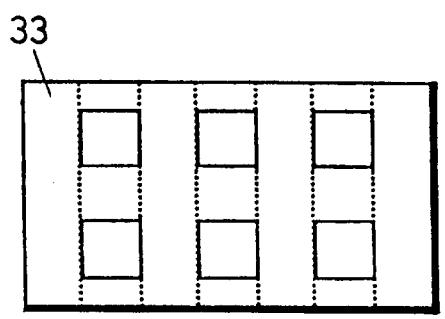

In FIGS. 4B and 4B', 1 $\mu$m of positive resist (OFPR-800, produced by Tokyo Ohka Kogyo Co., Ltd.) was applied on the transparent electrodes 32. After that, it was exposed into a shape of desirable pixel and then developed by sodium carbonate solution to form an insulating resist pattern 33.

Figure 4C:
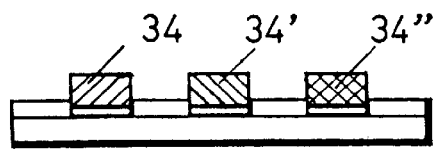
Figure 4C:
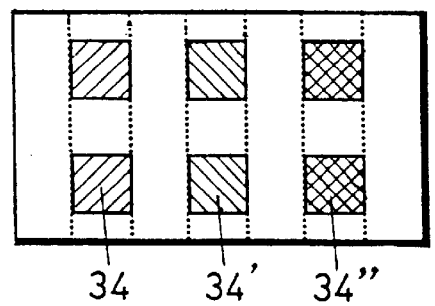

In FIGS. 4C and 4C', a group of pixels to be colored red was selected among the transparent electrodes 32, the transparent electrodes 32 were cathodized by a cationic acrylic electro-deposition resin and dispersed solution of red pigment, and red color filters 24 were formed by way of electro-deposition. Suceedingly, the same operation was repeated for green and blue to create color filters 34, 34' and 34" with 1.5 $\mu$m of thickness.

Figure 4D:
Figure 4D:
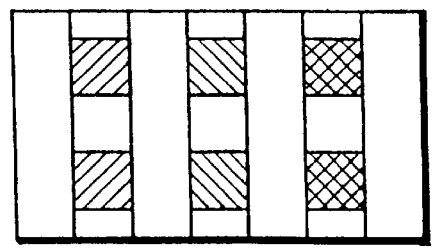

In FIGS. 4D and 4D', the insulating resist 33 was dissolved and peeled off by a strong alkali such as NaOH, KOH and tetramethylammonium hydroxide.

Figure 4E:
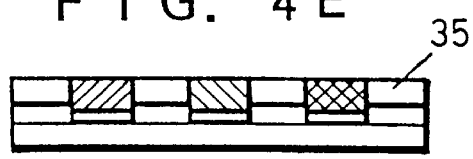
Figure 4E:
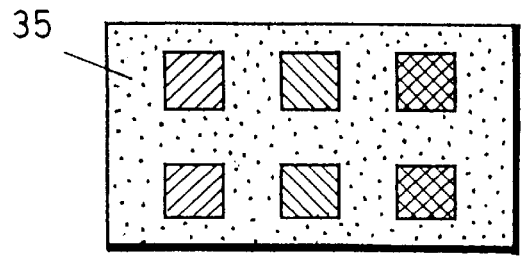

In FIGS. 4E and 4E', a negative black resist (CK-5002, produced by Fuji-Hunt Electronics Technology Co., Ltd.) was applied on the color filters, was exposed from the back side utilizing the color filters as masks and was developed to form a light shielding film 35.

The color filter substrate thus fabricated could be simply formed without being eroded by the strong alkali used in peeling off the insulating resist.

When the multicolor liquid crystal display was fabricated in the same manner with the first embodiment, the same effects as with the first embodiment could be obtained.

As explained in detail in connection with the aforementioned embodiments, a method for manufacturing a multicolor liquid crystal display according to the present invention allows the peripheries of pixels of a multicolor display combined with thin film transistors to be completely shielded and the leakage of light from the peripheries of the pixels to be eliminated without hampering the advantages of the simple processes of forming color filters by way of electro-deposition and of forming the light shielding film in self-alignment by fabricating the color filter substrate by the steps of:

1) patterning insulating resist on a plurality of electrodes formed on a substrate;

2) selectively energizing the plurality of electrodes to form color filters by way of electro-deposition on the electrodes;

3) forming a light shielding substance on the color filters; and 4) exposing the light shielding substance from the opposite side from the substrate face where the color filters have been formed by utilizing the color filters as masks to pattern the light shielding substance so as to leave it only in the gaps between the color filters. Thereby, the multicolor liquid crystal display in which the operation of the thin film transistor is stabilized, stray light is eliminated and the display quality and the contrast are improved may be provided at low cost.

What is claimed is:

1. A method for manufacturing a multicolor liquid crystal display which contains color filters comprising the steps of:

forming and patterning a plurality of electrodes on each of two substrates;

forming and patterning an insulating resist on a first part of one of the substrates;

forming and electro-depositing color filters on electrodes which are on a second part of the one of the substrates and are not covered with insulating resist, by selectively energizing them such that the thickness of the color filters is substantially greater than the thickness of the insulating resist;

covering over the color filters and the insulating resist with a light shielding substance;

exposing the light shielding substance from the side of the substrate opposite to the side carrying the color filters by using the color filters as photo-masks for patterning the light shielding substance so as to be left on the parts where the color filters are not formed; and placing liquid crystal material between the substrates.

* * * * *